US008049952B2

(12) United States Patent
Song et al.

(10) Patent No.: US 8,049,952 B2
(45) Date of Patent: Nov. 1, 2011

(54) ELECTROPHORETIC DISPLAY AND THE MANUFACTURING METHOD THEREOF

(75) Inventors: Keun-Kyu Song, Yongin-si (KR); Jung-Han Shin, Yongin-si (KR); Bo-Sung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 928 days.

(21) Appl. No.: 11/923,035

(22) Filed: Oct. 24, 2007

(65) Prior Publication Data

US 2008/0100565 A1 May 1, 2008

(30) Foreign Application Priority Data

Oct. 31, 2006 (KR) ........................ 10-2006-0106930

(51) Int. Cl.
*G02B 26/00* (2006.01)

(52) U.S. Cl. ........................................................ 359/296

(58) Field of Classification Search .................. 359/296, 359/297, 298; 345/107

See application file for complete search history.

(56) References Cited

U.S. PATENT DOCUMENTS

| | | | | |
|---|---|---|---|---|
| 6,184,856 | B1 * | 2/2001 | Gordon et al. | 345/107 |
| 6,727,873 | B2 * | 4/2004 | Gordon et al. | 345/88 |
| 7,409,876 | B2 * | 8/2008 | Ganapathi et al. | 73/862.046 |
| 7,532,388 | B2 * | 5/2009 | Whitesides et al. | 359/296 |
| 7,750,987 | B2 * | 7/2010 | Byun et al. | 349/43 |
| 7,767,112 | B2 * | 8/2010 | Hou et al. | 252/500 |
| 2006/0244715 | A1 * | 11/2006 | Kim | 345/107 |
| 2010/0003883 | A1 * | 1/2010 | Lee et al. | 445/24 |

FOREIGN PATENT DOCUMENTS

JP 2004-062040 2/2004

* cited by examiner

*Primary Examiner* — Joseph P Martinez
(74) *Attorney, Agent, or Firm* — F. Chau & Associates, LLC

(57) ABSTRACT

An elecotrophoretic display device includes a first substrate, a gate line formed on the first substrate, a data line crossing the gate line to form a defined area, a source electrode connected to the data line, a drain electrode facing the source electrode to define a channel area, a color filter formed on the first substrate, a first electrode formed on the color filter, the first electrode electrically connected to the drain electrode, a second substrate facing the first substrate, a second electrode formed on the second substrate and a fluid and a plurality of charged particles interposed between the first electrode and the second electrode.

18 Claims, 3 Drawing Sheets

ELECTROPHORETIC DISPLAY AND THE MANUFACTURING METHOD THEREOF

CROSS-REFERENCE TO RELATED APPLICATION

The present application claims priority to Korean Patent Application No. 2006-106930, filed on Oct. 31, 2006, the disclosure of which is incorporated herein by reference.

BACKGROUND OF THE INVENTION

1. Technical Field

The present disclosure relates to an electrophoretic display device, and a method of manufacturing the electrophoretic display device, and more particularly, to an electrophoretic display device capable of improving display quality.

2. Discussion of the Related Art

An electrophoretic display device is a flat display device. The electrophoric display device displays an image by using an electrophoresis characteristic of moving charged particles. The moving charged particles are disposed between two electrodes facing each other. The charged particles move toward one of the electrodes having an opposite polarity to that of the charged particles. The opposite polarity is generated due to voltage difference generated by the electrodes.

The electrophoretic display device includes an upper substrate having a color filter and a lower substrate having a thin film transistor and a pixel electrode. The electrophoretic display device includes a micro capsule interposed between the upper substrate and the lower substrate. Particles having a white color and a black color are dispersed in the micro capsule. When the upper substrate and the lower substrate are coupled to each other, misalignment between the two substrates can occur so that display quality can be deteriorated.

When the micro capsule is formed between the upper substrate and the lower substrate, a polyethylenterephthalate (PET) based layer supporting the micro capsule can be attached to the upper substrate.

However, when light, incident from the outside and passing through the upper substrate, passes through the PET, the light can be dispersed so that a color mixing can occur. For example, a red light or a blue light can exit from a green pixel portion.

SUMMARY OF THE INVENTION

Exemplary embodiments of the present invention provide an electrophoretic display device capable of improving display quality, and a method of manufacturing the electrophoretic display device.

According to an exemplary embodiment of the present invention, an elecotrophoretic display device includes a first substrate, a gate line formed on the first substrate, a data line crossing the gate line to form a defined area, a source electrode connected to the data line, a drain electrode facing the source electrode to define a channel area, a color filter formed on the first substrate, a first electrode formed on the color filter, the first electrode electrically connected to the drain electrode, a second substrate facing the first substrate, a second electrode formed on the second substrate, and a fluid and a plurality of charged particles interposed between the first electrode and the second electrode. The elecotrophoretic display device may further include a micro capsule including the fluid and the charged particles. The elecotrophoretic display device may further include an adhesion layer formed on the first electrode. The micro capsule can be formed on the adhewion layer. A receiving member having a cylindrical shape may include the fluid and the charged particles. The receiving member having the cylindrical shape can be formed on the adhesion layer.

The elecotrophoretic display device may include a gate insulation layer formed on the gate line. The gate insulation layer may include an opening portion overlapping the defined area.

The elecotrophoretic display device may include a passivation layer to cover the channel area. The passivation layer may include an opening portion overlapping the defined area.

The charged particles may include white charged particles. The charged particles may include black charged particles having a polarity opposite to the white charged particles. The second substrate can be flexible.

The gate line may include at least one of chromium, chromium oxide, molybdenum, or molybdenum oxide.

The data line may include at least one of chromium, chromium oxide, molybdenum or molybdenum oxide.

The color filter may include at least one of a red color filter, a green color filter, a blue color filter and a white color filter.

According to an exemplary embodiment of the present invention, a method of manufacturing an elecotrophoretic display device includes forming a gate line formed on a first substrate, forming a data line crossing the gate line, forming a color filter formed the first substrate having the data line, forming a first electrode formed on the color filter, forming a second electrode formed on a second substrate, forming a receiving member including a fluid and a plurality of charged particles formed on the second electrode, and coupling the second substrate with the first substrate.

The second substrate may be coupled with the first substrate through a lamination process.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein.

Figure 1:
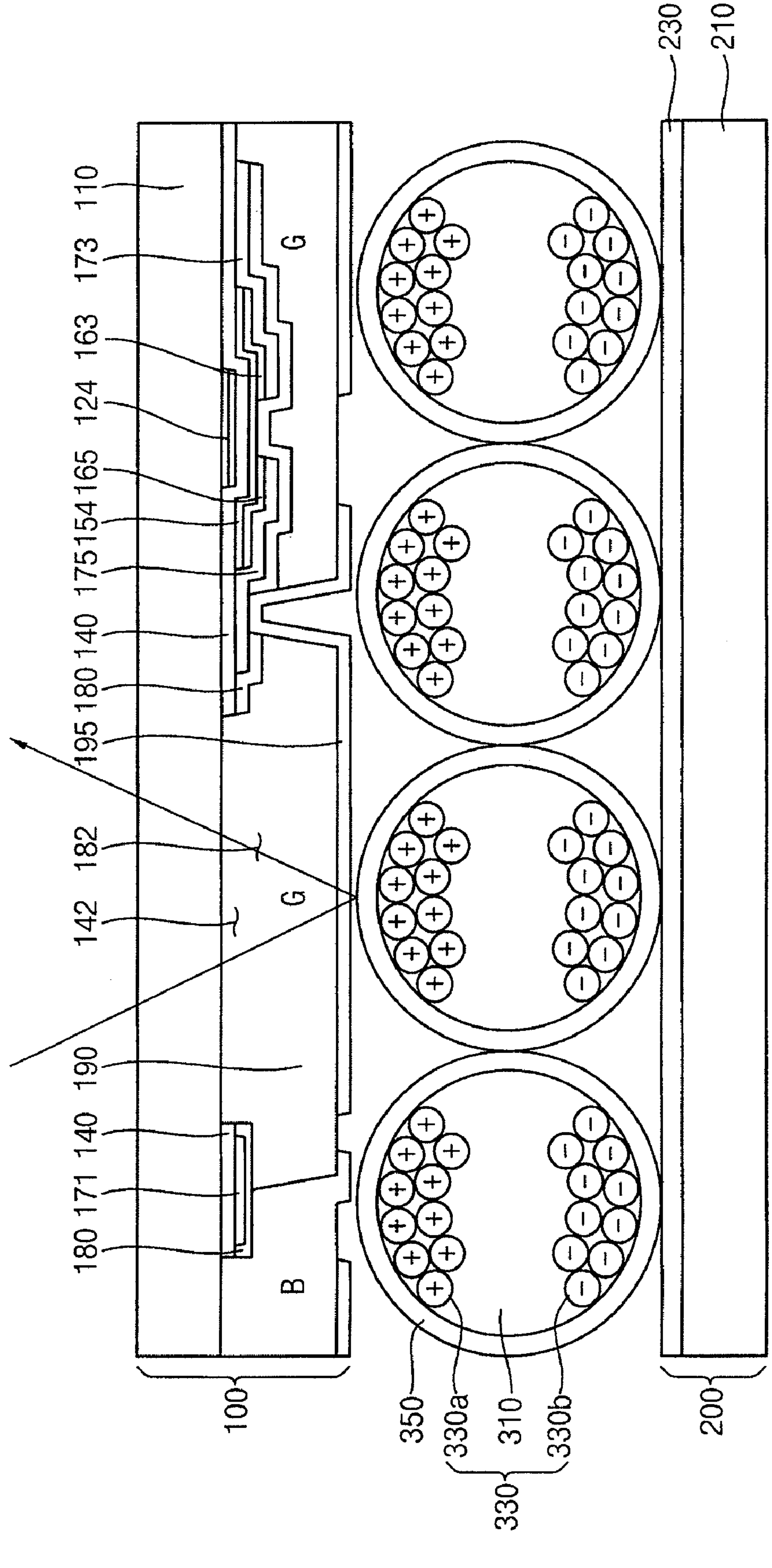
FIG. 1 is a cross-sectional view showing an electrophoretic display device according to an exemplary embodiment of the present invention.
Figure 2:
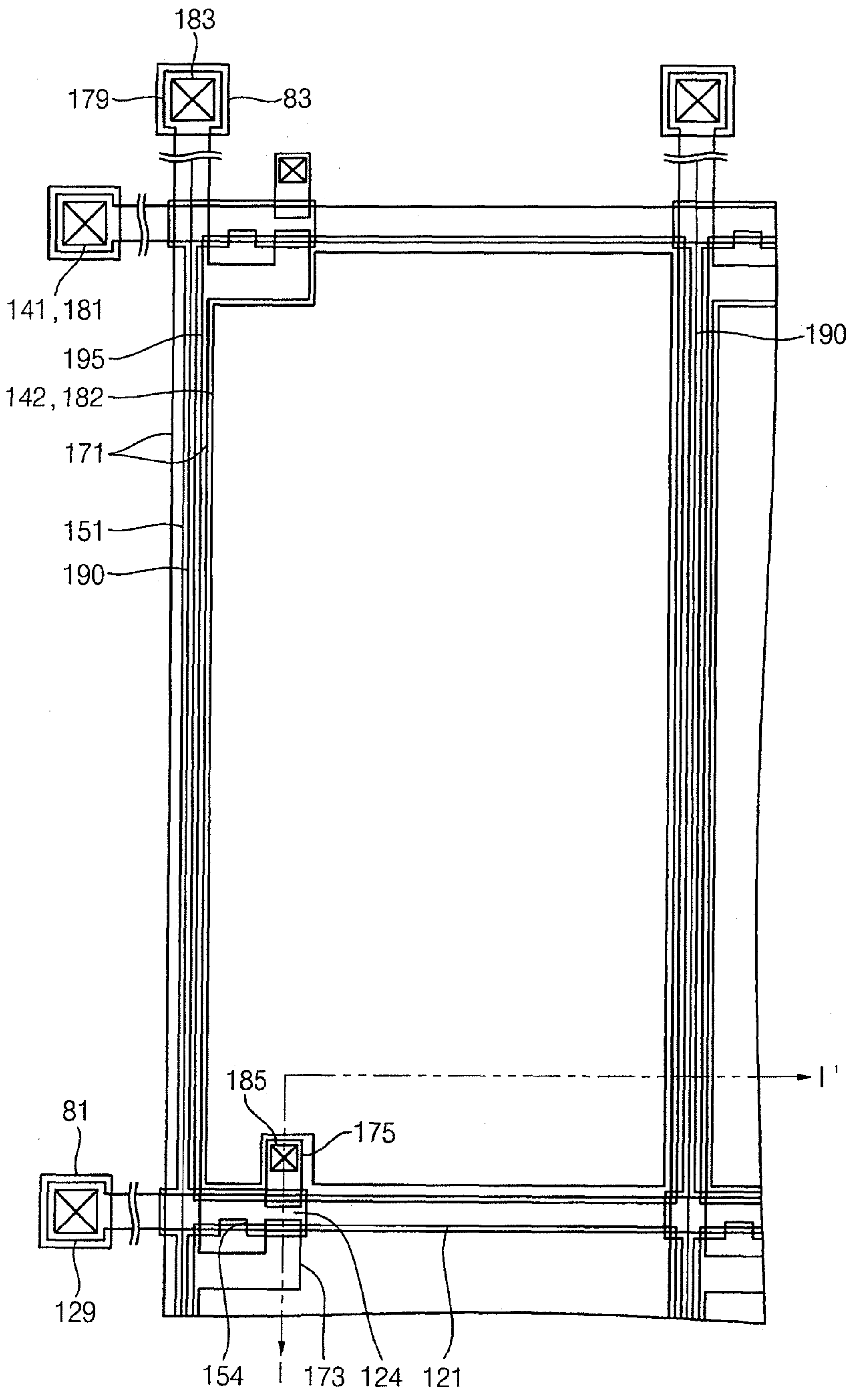
FIG. 2 is a plan view showing an area in which a data line and a gate line cross each other according to an exemplary embodiment of the present invention.

FIG. 1 is a cross-sectional view showing an electrophoretic display device according to an exemplary embodiment of the present invention. FIG. 2 is a plan view showing an area in which a data line and a gate line cross each other according to an exemplary embodiment of the present invention.

Referring to FIG. 1, an electrophoretic display device may include a thin film transistor (TFT) substrate 100, a countering substrate 200, fluid 310 and a plurality of charged particles 330. The fluid 310 and the plurality of charged particles 330 are interposed between the TFT substrate 100 and the countering substrate 200 and are positioned in a receiving member. In an exemplary embodiment, a micro capsule receives the fluid 310 and the charged particles 330. The fluid 310 and the plurality of charged particles 330 can be disposed in a receiving member having, for example, a cylindrical shape.

The TFT substrate 100 may include an upper substrate 110, a TFT, a pixel electrode 195 and a color filter 190. A plurality of gate lines 121 having a gate electrode 124 are formed on the upper substrate 110. The upper substrate 110 may include a transparent material such as, for example, glass. The plurality of gate lines 121 supply a gate signal and are formed in a first direction, for example, a horizontal direction. Each of the gate lines 121 includes a plurality of gate electrode 124 protruded upwardly and an end portion 129 having an enlarged area to connect with a different layer or an external driving circuit.

The gate line 121 may include a conductive material such as, for example, metal. The gate line 121 may include, for example, chromium/chromium oxide or molybdenum/molybdenum oxide. In an exemplary embodiment, a lower layer of the gate line 121 includes chromium oxide, and an upper layer of the gate line 121 includes chromium. In an exemplary embodiment, the gate line 121 may include chromium oxide or molybdenum oxide, which does not reflect light and have a dark color to act as a light blocking layer. A thickness of the lower layer may be about 500 Å, and a thickness of the upper layer may be about 1500 Å to about 2000 Å.

A gate insulation layer 140 including silicon nitride ($SiN_x$) or silicon oxide ($SiO_2$) is formed on the gate line 121. In an exemplary embodiment, the gate insulation layer 140 may include an opening portion 142 overlapping an area defined by crossing the gate line 121 and the data line 171. The gate insulation layer 140 corresponding to the defined area is exposed. In the electrophoretic display device, external light, passed through the upper substrate 110 and the color filter 190, is reflected by the charged particles 330, and then perceived by an observer. When the gate insulation layer 140 corresponding to the defined area is removed, a loss of light caused by the gate insulation layer 140 can be decreased. The gate insulation layer 140 may include a contact hole 141 to expose the end portion 129 of the gate line 121.

A plurality of linear semiconductor layers 151 including hydrogenated amorphous silicon or polysilicon are formed on the gate insulation layer 140. The plurality of linear semiconductor layers 151 are formed in a second direction such as a perpendicular direction, and include a plurality of protruding portions 154 protruded toward the gate electrode 124.

Ohmic contact layers 163, 165 are formed on the linear semiconductor layer 151. The ohmic contact layers 163, 165 may include, for example, n+ hydrogenated amorphous silicon doped with n-type impurities having a high concentration and/or silicide. The ohmic contact layers 163, 165 may include a first portion overlapping the linear semiconductor layer 151 and a second portion overlapping the protruding portion 154 of the linear semiconductor layer 151.

A data line 171 including a source electrode 173 and a drain electrode 175 separated from the source electrode 173 are formed on the ohmic contact layer 163, 165 and the gate insulation layer 140.

The data line 171 supplies a data signal and is extended along the second direction. The gate line 121 and the data line 171 cross each other. Each data line 171 includes the source electrode 173 protruded toward the drain electrode 175 and an end portion 179 having an enlarged area to connect with a different layer or an external driving circuit. When a data driving circuit (not shown) to generate the data signal is integrated on the upper substrate 110, the data line 171 can be extended and directly connected to the data driving circuit.

The TFT includes the gate electrode 124, the source electrode 173, the drain electrode 175 and the protruding portion 154 of the linear semiconductor layer 151. A channel of the TFT is positioned between the source electrode 173 and the drain electrode 175 and is formed on the protruding portion 154 of the linear semiconductor layer 151.

The data line 171 and the drain electrode 175 may include a conductive material such as, for example, metal. The data line 171 and the drain electrode 175 may include, for example, chromium/chromium oxide or molybdenum/molybdenum oxide. In an exemplary embodiment, a lower layer of the data line 171 includes chromium oxide, and an upper layer of the data line 171 includes chromium. In an exemplary embodiment, the data line 171 may include chromium oxide or molybdenum oxide, which does not reflect light and has a dark color to act as a light blocking layer. A thickness of the lower layer may be about 500 Å, and a thickness of the upper layer may be about 1500 Å to about 2000 Å.

The ohmic contact layers 163, 165 are formed between a first portion and a second portion. The first portion includes the linear semiconductor layer 151 and the protruding portion 154. The second portion includes the data line 171 and the drain electrode 175. The ohmic contact layers 163, 165 lower contact resistance formed between the first portion and the second portion. The linear semiconductor layer 151 may include a plurality of exposed portions in which the data line 171, the drain electrode 175 and the ohmic contact layers 163, 165 are not formed between the source electrode 173 and the drain electrode 175.

A passivation layer 180 is formed on the exposed portions. The passivation layer may include an inorganic material such as, for example, silicon nitride ($SiN_x$) or silicon oxide ($SiO_2$). In an exemplary embodiment, the passivation layer 180 includes an opening portion 182 overlapping the defined area. In other words, the passivation layer 180 corresponding to the defined area is exposed. In the electrophoretic display device, external light, passed through the color filter 190, is reflected by the charged particles 330, and then perceived by an observer. When the passivation layer 180 corresponding to the defined area is removed, a loss of light caused by the passivation layer 180 can be decreased.

The opening portion 182 of the passivation layer 180 and the opening portion 142 of the gate insulation layer 140 may include substantially the same boundary. In an exemplary embodiment, a shape of the opening portion 182 of the passivation layer 180 and the opening portion 142 of the gate insulation layer 140 can vary.

The passivation layer 180 may include a plurality of contact holes 183, 185 to expose the end portion 179 of the data line 171 and an enlarged portion of the drain electrode 175. The passivation layer 180 may include a contact hole 181 to expose the end portion 129 of the gate line 121.

The contact hole 181 of the passivation layer 180 and the contact hole 141 of the gate insulation layer 140 may include substantially the same boundary.

The color filters 190 are formed on the data line 171, the drain electrode 175, the passivation layer 180 and the substrate 110. The color filters 190 include a photosensitive organic material having pigments or dyes to display a color. For example red, green, blue or white color filters in which the photosensitive organic material includes red, green, blue, or white pigments or dyes, may be used.

The color filters 190 having same colors are arranged in a direction substantially parallel with the data line 171. The color filters 190 having different colors are arranged in a direction substantially parallel with the gate line 121. The color filters 190 having the same colors may be formed in a linear shape. The color filters 190 having the different colors may overlap the data line 171. In an exemplary embodiment, the color filters 190 having the same colors may be formed in an island shape, and the color filters 190 having different colors may overlap the data line 171.

A plurality of pixel electrodes 195 and a plurality of contact assistant members 81, 83 are formed on the color filters 190. The pixel electrodes 195 and the contact assistant members 81, 83 may include a transparent material such as, for example, indium tin oxide (ITO) or indium zinc oxide (IZO).

The pixel electrode 195 is electrically connected to the drain electrode 175 through the contact hole 185.

The contact assistant members 81, 83 are connected to the end portion 129 of the gate line 121 and the end portion 179 of the data line 171 through the contact holes 141, 181, 183, respectively.

The contact assistant members 81, 83 improve an adhesion characteristic between a first portion and a second portion. The first portion includes the end portions 129, 179 of the gate line 121 and the data line 171. The second portion includes an external device. The contact assistant members 81, 83 protect the end portions 129, 179 of the gate line 121 and the data line 171.

The countering substrate 200 facing the TFT substrate 100 includes a lower substrate 210 and a common electrode 230 formed on the lower substrate 210.

The lower substrate 210 may include a transparent material such as, for example, glass or plastic. In an exemplary embodiment, the lower substrate 210 may include polyethylenterephthalate (PET). When the lower substrate 210 comprises plastic, the electrophoretic display device can be thinner and flexible. The lower substrate 210 can be attached to the upper substrate 110 through a lamination process.

The common electrode 230 including a transparent conductive material is formed on the lower substrate 210.

The TFT substrate 100 in accordance with an exemplary embodiment of the present invention includes the pixel electrode 195 and the color filters 190. Since the gate line 121 and the data line 171 act as a light blocking layer, an additional light blocking layer may not be formed on the countering substrate 200. As a result, the lower substrate 210 includes only the common electrode 230. Thus, the lower substrate 210 may include the plastic or soda-lime glass and a process of manufacturing the lower substrate 210 can be simplified.

The fluid 310 and the plurality of charged particles 330 are interposed between the TFT substrate 100 and the countering substrate 200. The fluid 310 and the charged particles 330 are positioned in a receiving member. In an exemplary embodiment, a micro capsule receives the fluid 310 and the charged particles 330.

The fluid 310 is a medium to disperse the charged particles 330. The fluid 310 may have lower viscosity and a lower dielectric constant enough not to disturb the movement of the charged particles 330.

The charged particles 330 may include white charged particles **330*a* and black charged particles 330*b*. The white charged particles 330*a* may include, for example, titanium oxide ($TiO_2$) or silica ($SiO_2$). The black charged particles 330*b*** may include, for example, carbon black or titanium oxide ($TiO_2$) and silica ($SiO_2$) colored by a black pigment.

The white charged particles **330*a* and the black charged particles 330*b* are charged to have a polarity opposite to each other. For example, the white charged particles 330*a* have a positive polarity, and the black charged particles 330*b*** have a negative polarity.

Figure 3:
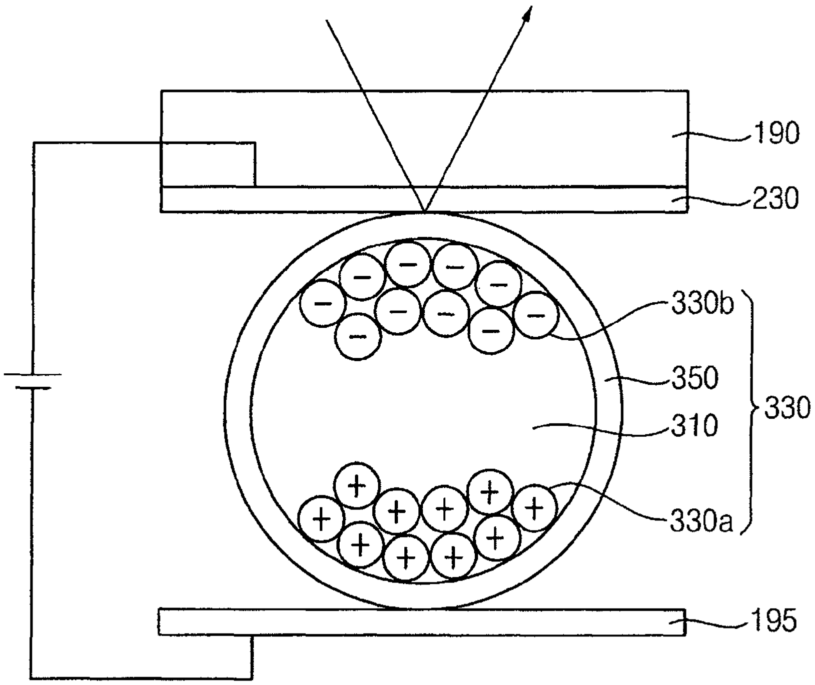
FIG. 3 is a cross-sectional view showing charged particles representing a black status according to an exemplary embodiment of the present invention.
Figure 4:
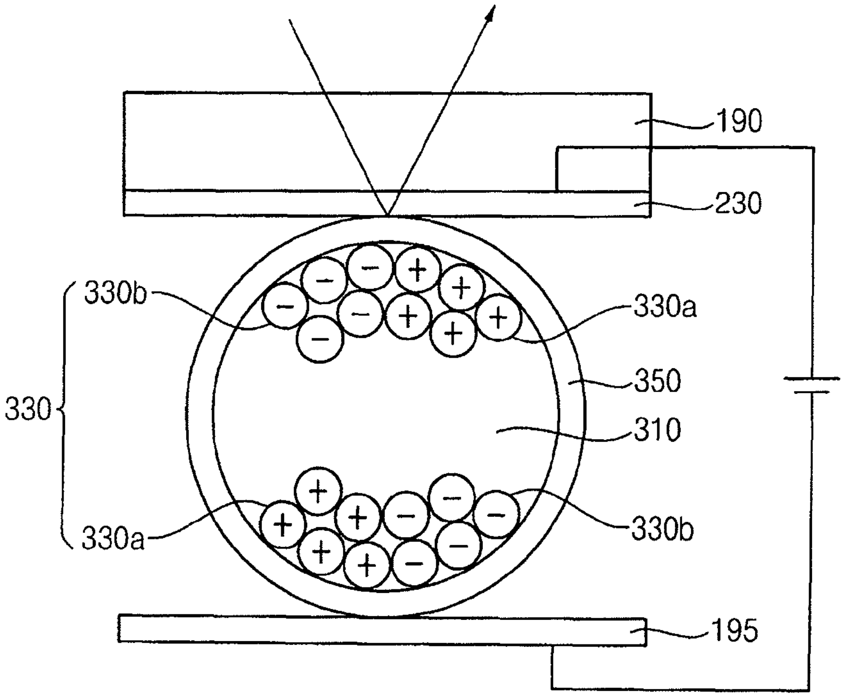
FIG. 4 is a cross-sectional view showing charged particles representing a gray status according to an exemplary embodiment of the present invention.

FIG. 3 is a cross-sectional view showing charged particles representing a black status according to an exemplary embodiment of the present invention. FIG. 4 is a cross-sectional view showing charged particles representing a gray status according to an exemplary embodiment of the present invention.

When a voltage is applied to the pixel electrode 195 and the common electrode 230 to form a voltage difference, the white and black charged particles **330*a*, 330*b*** charged by the positive polarity or the negative polarity are moved toward an electrode having an opposing polarity according to the electrophoretic characteristic.

An observer perceives light that is incident from outside and reflected by the charged particles **330*a*, 330*b*. The white charged particles 330*a* reflect light, and the black charged particles 330*b* absorb the light. Thus, when the white charged particles 330*a* upwardly moves toward the observer, the observer can perceive a black status. When the black charged particles 330*b* upwardly move toward the observer, the observer can perceive a white status. When the white charged particles 330*a* and the black charged particles 330*b*** are mixed and upwardly moved, the observer can perceive a gray status.

The color filters 190 are formed between the upper substrate 110 and the pixel electrode 195. Light incident from outside passes through the color filters 190 and is reflected by the charged particles **330*a*, 330*b*. The light passes through the color filters 195** again so that the observer can perceive the light. Thus, a gray scale and colors including a red, green or blue color can be displayed.

Hereinafter, the method of fabricating the elecotrophoretic display device according to exemplary embodiments of the present invention will be described in detail.

The gate line 121, the gate insulation layer 140, the semiconductor layer 151, 154, the ohmic contact layer 163, 165 and the data line 171 are formed on the upper substrate 110.

The passivation layer 180 is formed on the upper substrate 100 in which the data line 171 is formed. In an exemplary embodiment, the inorganic insulation material such as, for example, silicon nitride ($SiN_x$) or silicon oxide ($SiO_2$) is formed on the substrate through a chemical vapor deposition (CMP) process. A photosensitive material is coated on the inorganic insulation material, and a photosensitive layer pattern is formed through a photolithography process. The inorganic insulation material is etched by a dry etching process or a wet etching process through the photosensitive layer pattern as a mask to form the passivation layer 180.

The passivation layer 180 may include a plurality of contact holes 183, 185 to expose the end portion 179 of the data line 171 and the enlarged portion of the drain electrode 175. The passivation layer 180 may include the opening portion 182 overlapping the defined area, and the contact hole 181 to expose the end portion 129 of the gate line 121.

When the passivation layer 180 is etched, the gate insulation layer 140 formed in the defined area and the gate insulation layer 140 formed at the end portion 129 of the gate line are etched. Thus, the opening portion 142 of the gate insulation layer 140 and the contact hole 141 of the gate insulation layer 140 to expose the end portion 129 of the gate line 121 are formed with the passivation layer 180.

The opening portion 182 of the passivation layer 180 and the opening portion 142 of the gate insulation layer 140 may include substantially the same boundary. The contact hole

181 of the passivation layer 180 and the contact hole 141 of the gate insulation layer 140 may include substantially the same boundary.

The color filters 190 are formed on the substrate on which the passivation layer 180 is formed. The pixel electrode 195 is formed on the substrate on which the color filters 190 are formed through, for example, a sputtering process.

The common electrode 230 is formed on the lower substrate 210 including, for example, plastic through a sputtering process. The micro capsule 350 including the fluid 310 and the charged particles 330 is formed on the lower substrate 210 on which the common electrode 230 is formed. An adhesion layer (not shown) may be formed on the micro capsule 350.

The lower substrate 210 on which the micro capsule 350 and the common electrode 230 are formed is coupled with the upper substrate 110. The lower substrate 210 may be pressed by a laminator to be coupled with the upper substrate 110. In an exemplary embodiment, the lower substrate 210 is positioned over the upper substrate 110 and the lower substrate 210 may be pressed by a roller to be coupled with the upper substrate 110.

According to an exemplary embodiment of the present invention, the electrophoretic display device is driven by an active driving method using the TFT. In an exemplary embodiment, the electrophoretic display device is driven by a passive driving method applying voltages between two electrodes crossing each other.

According to exemplary embodiments of the present invention, color filters are formed on a substrate in which a pixel electrode and a TFT are formed. Thus, a misalignment can be prevented and display quality of the electrophoretic display device can be improved.

According to an exemplary embodiment of the present invention, an upper substrate does not include PET so that a color mixing caused by a light diffusion can be decreased. Thus, display quality of the elecotrophoretic display device can be improved.

According to an exemplary embodiment of the present invention, the pixel electrode is formed on the color filters and fluid and a plurality of charged particles are formed on the pixel electrode so that the plurality of charged particles can be moved easily.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. An electrophoretic display device comprising:

a first substrate;

a gate line disposed on the first substrate;

a data line crossing the gate line;

a source electrode connected to the data line;

a drain electrode spaced apart from the source electrode;

a color filter disposed on the first substrate;

a first electrode disposed on the color filter, the first electrode electrically connected to the drain electrode;

a second substrate facing the first substrate;

a second electrode disposed on the second substrate; and a fluid and a plurality of charged particles interposed between the first electrode and the second electrode, the charged particles absorbing or reflecting light incident thereon through the first substrate having the color filter.

2. The electrophoretic display device of claim 1, wherein the first electrode is disposed directly-on the color filter.

3. The electrophoretic display device of claim 1, further comprising an adhesion layer disposed on the first electrode, wherein the fluid and the charged particles are disposed on the adhesion layer.

4. The electrophoretic display device of claim 1, further comprising a gate insulation layer disposed on the gate line, wherein the gate insulation layer includes an opening portion overlapping the first electrode.

5. The electrophoretic display device of claim 1 further comprising a passivation layer to cover the source and drain electrodes, wherein the passivation layer includes an opening portion overlapping the first electrode.

6. The electrophoretic display device of claim 1, wherein the charged particles comprise white charged particles.

7. The electrophoretic display device of claim 6, wherein the charged particles comprise black charged particles having a polarity opposite to the white charged particles.

8. The electrophoretic display device of claim 1, wherein the second substrate is flexible.

9. The electrophoretic display device of claim 1, wherein the gate line includes a non-transparent material.

10. The electrophoretic display device of claim 9, wherein the gate line comprises at least one of chromium, chromium oxide, molybdenum or molybdenum oxide.

11. The electrophoretic display device of claim 1, wherein the data line includes a non-transparent material.

12. The electrophoretic display device of claim 11, wherein the data line comprises at least one of chromium, chromium oxide, molybdenum, or molybdenum oxide.

13. The electrophoretic display device of claim 1, wherein the color filter comprises at least one of a red color filter, a green color filter, a blue color filter or a white color filter.

14. The electrophoretic display device of claim 13, wherein the color filters having different colors overlaps on the data line.

15. The electrophoretic display device of claim 1, wherein an external light passing through the first substrate and the color filter is reflected by the charged particles, and then perceived by an observer.

16. A method of manufacturing an electrophoretic display device, the method comprising:

forming a gate line on a first substrate;

forming a gate insulation layer on the gate line;

forming a semiconductor layer on the gate insulation layer;

forming a data line crossing the gate line;

forming a passivation layer on a first substrate;

forming a color filter on the first substrate having the data line formed thereon;

forming a first electrode on the color filter;

forming a second electrode on a second substrate;

forming a receiving member including fluid and a plurality of charged particles on the second electrode; and coupling the second substrate with the first substrate.

coupling the second substrate with the first substrate.

17. The method of claim 16, wherein the second substrate is coupled with the first substrate through a lamination process.

18. The method of claim 16, further comprising:

forming an opening portion through the passivation layer and an opening portion through the gate insulation layer, the opening portions overlapping the first electrode.

* * * * *